US012592530B2

(12) United States Patent
Krapf

(10) Patent No.: US 12,592,530 B2
(45) Date of Patent: Mar. 31, 2026

(54) CLOCK SPRING ASSEMBLY

(71) Applicant: NEXANS, Courbevoie (FR)

(72) Inventor: Stefan Krapf, Flossenbürg (DE)

(73) Assignee: NEXANS, Courbevoie (FR)

( * ) Notice: Subject to any disclaimer, the term of this patent is extended or adjusted under 35 U.S.C. 154(b) by 316 days.

(21) Appl. No.: 18/519,235

(22) Filed: Nov. 27, 2023

(65) Prior Publication Data

US 2024/0213731 A1 Jun. 27, 2024

(30) Foreign Application Priority Data

Dec. 8, 2022 (EP) .................................... 22306822

(51) Int. Cl.
*H01R 35/04* (2006.01)

(52) U.S. Cl.
CPC ......... *H01R 35/04* (2013.01); *H01R 2201/26* (2013.01)

(58) Field of Classification Search
CPC ... H01R 35/025; H01R 35/04; H01R 2201/26
USPC .................................... 439/163, 164, 13, 15
See application file for complete search history.

(56) References Cited

U.S. PATENT DOCUMENTS 5,382,172 A * 1/1995 Klier .................... B60R 16/027 439/15
5,601,437 A 2/1997 Harvey et al.
5,772,146 A * 6/1998 Kawamoto ........... B60R 16/027 242/388.6
6,213,797 B1 * 4/2001 Best ..................... H01R 35/025 439/15
6,302,716 B1 * 10/2001 Matsumoto ........... B60R 16/027 439/164
6,325,657 B1 * 12/2001 Schroer ................ H01R 35/025 439/404
7,413,454 B2 * 8/2008 Reber .................. H01R 35/025 439/164
7,726,989 B2 * 6/2010 Steinert ................ H01R 35/025 439/164
8,177,567 B2 * 5/2012 Schroer ................ H01R 35/025 439/15

(Continued)

FOREIGN PATENT DOCUMENTS

EP 1247697 10/2002
WO WO-2020071496 A1 * 4/2020 ........... B60R 16/027

OTHER PUBLICATIONS

European Report Dated May 10, 2023.

*Primary Examiner* — Marcus E Harcum
(74) *Attorney, Agent, or Firm* — IPSILON USA, LLP

(57) ABSTRACT

A clock spring assembly includes a stationary housing and a rotor. The stationary housing and the rotor cooperatively define a chamber that accommodates at least one flexible ribbon cable (501) that is wound in a first rotational direction onto the rotor and fixed at one end to the rotor and at the other end to the stationary housing. The flexible ribbon cable is wound around the rotor (601) and establishes an electrical connection between the rotor and the stationary housing. A rupture pin (502) is attached to the at least one ribbon cable. A slot (605) is provided in the housing and captures the rupture pin if the rotor is overwound in the second rotational direction opposite to the first rotational direction such that the rupture pin blocks the ribbon cable (501) from unwinding any further.

10 Claims, 4 Drawing Sheets

(56) References Cited

U.S. PATENT DOCUMENTS

| | | | | |
|---|---|---|---|---|
| 8,727,936 | B2 * | 5/2014 | Asakura | H01R 35/025<br>439/15 |
| 8,974,233 | B2 * | 3/2015 | Asakura | H01R 35/04<br>439/15 |
| 8,974,234 | B2 * | 3/2015 | Takahashi | H01R 35/025<br>439/15 |
| 2008/0064262 | A1 * | 3/2008 | Wu | H01R 35/025<br>439/607.41 |
| 2009/0301803 | A1 | 12/2009 | Obliajek | |
| 2009/0317995 | A1 * | 12/2009 | Oishi | H01R 35/025<br>439/164 |
| 2011/0131821 | A1 | 6/2011 | Goll | |
| 2013/0252441 | A1 * | 9/2013 | Yamaguchi | B60R 16/027<br>439/15 |
| 2013/0344706 | A1 * | 12/2013 | Sato | B60R 16/027<br>439/15 |
| 2014/0057462 | A1 * | 2/2014 | Takahashi | B60R 16/027<br>439/13 |
| 2021/0218210 | A1 * | 7/2021 | Hasegawa | B60R 16/02 |

* cited by examiner

CLOCK SPRING ASSEMBLY

RELATED APPLICATION

This application claims the benefit of priority from European Patent Application No. 22 306 822.2, filed on Dec. 8, 2022, the entirety of which is incorporated by reference.

FIELD

The present disclosure relates to a clock spring assembly and in particular to a clock spring assembly that prevents faulty electric signals if the clock spring is incorrectly mounted.

BACKGROUND

For many years already automobiles are equipped with airbag crash systems. Typically, one airbag is arranged in the rotating steering wheel of the automobile. In most cases the steering wheel is equipped with additional electrical input devices such as switches and buttons allowing the driver to control for example an audio and telephone system or cruise control settings of the automobile without taking off the hands from the steering wheel. Obviously, rotatable electrical connections between the rotatable steering wheel and the stationary cabling of the automobile are necessary for proper operation of the electronic components and the airbag. Electrical brushes resting on conductive rings are no option for automobiles because the reliability of the electrical contacts is insufficient especially when an accident occurs. Therefore, in today's automobiles clock spring interconnectors (briefly clock springs) have been developed to provide for rotatable electric connections between the steering wheel and the stationary cabling of the automobile. The clock spring comprises a stationary housing and a rotatable rotor including a cover. These components cooperatively define a chamber accommodating one or several flat ribbon cables. The ribbon cables are connected at one end with the rotor and on the other end with the stationary cabling of the automobile. The ribbon cables are wound on the rotor and unwind or wind up as the rotor rotates jointly with the steering wheel. The ribbon cables are long enough to permit the steering wheel to turn from the left stop to the right stop. For instance, in trucks the steering wheel can turn +/−3.25 turn and in cars e.g. +/−1.5 to 2 turns. These parameters are only examples and other implementations are possible. In any case the ribbon cables are long enough to enable the steering wheel turning from its left stop to its right stop to achieve the maximum possible steering angle.

A properly centered clock spring, i.e. the clock spring permits the same number of turns to the left and to the right when installed in a steering wheel in its neutral position, works without problem over extended periods of time. However, if the clock spring and/or the airbag has to be replaced for instance after an accident, then it may happen, that the replacement clock spring is mounted not in a centered position. If due to that the ribbon cable is disrupted then normally and a failure signal is indicated to the driver. The failure signal, e.g. a warning lamp turns on, makes the driver aware of the problem. However, it may also happen that the unwinding of the ribbon cable is only hampered without triggering the failure signal, and faulty electrical signals are generated that may trigger the inflation of an airbag and cause an accident in the worst case.

In view of the limitations of existing clock springs there remains a desire for an improved clock spring to overcome or at least improve one or more of the problems mentioned at the outset.

SUMMARY

According to a first aspect the present disclosure suggests a clock spring assembly comprising a stationary housing and a rotor. The stationary housing and the rotor cooperatively define a chamber that accommodates at least one flexible ribbon cable that is wound in a first rotational direction onto the rotor and fixed at one end to the rotor and at the other end to the stationary housing. The flexible ribbon cable establishes an electrical connection between the rotor and the stationary housing. A rupture pin is attached to the at least one ribbon cable. A slot is provided in the housing and captures the rupture pin if the rotor is overwound in a second rotational direction opposite to the first rotational direction such that the rupture pin blocks the ribbon cable from unwinding any further. Specifically, the first rotational direction is in counterclockwise direction and the second rotational direction is in clockwise direction or vice versa.

The clock spring assembly prevents that conductor paths on the ribbon cable in the clock spring assembly are damaged and may therefore cause faulty electrical signals which, in the worst case, may trigger the inflation of an airbag In one embodiment the clock spring assembly comprises electrical connectors attached to the rotor and to the stationary housing, respectively. The electrical connectors are connected by the at least one ribbon cable. The ribbon cable establishes a reliable and durable electrical connection between the electrical connectors.

Advantageously, the ribbon cable is torn off when the rotor is turned further in the second rotational direction after the ribbon cable has been blocked by the rupture pin. The loss of an electrical connection is detectable and can be used to trigger a warning signal to the driver.

In one embodiment the at least one ribbon cable is torn off from an electrical connector.

In an advantageous embodiment the slot is curved. The curved slot provides an improved capturing of the rupture pin in the slot.

In a preferred embodiment the clock spring assembly comprises a side wall in the chamber which blocks the ribbon cable when the rotor is overturned into the first rotational direction.

It has been found useful when the rupture pin extends beyond of one or both longitudinal edges of the at least one ribbon cable. The rupture pin forming one or two protrusions readily engages with the slot in the housing.

If the rupture pin forms two protrusions it is advantageous when the clock spring comprises a cover provided with a slot which captures the rupture pin if the rotor is overwound in the second rotational direction.

The rupture pin may be realized as a spring pin with two protrusions extending beyond both longitudinal edges of the at least one ribbon cable. A spring pin can facilitate the engagement of the two protrusions in the slots.

In a preferred embodiment the rupture pin is covered with at least one layer of the ribbon cable when passing the slot if the clock spring assembly is installed in its centered position. This arrangement assures that properly centered clock spring functions properly and the rupture pin does not engage with the slot in the housing during operation of the clock spring.

BRIEF DESCRIPTION OF THE DRAWINGS

Exemplary embodiments of the present disclosure are illustrated in the drawings and are explained in more detail in the following description. In the figures, the same or similar elements are referenced with the same or similar reference signs. It shows.

In the figures the same or similar components are labelled with the same or similar reference signs.

DETAILED DESCRIPTION

Figure 1:
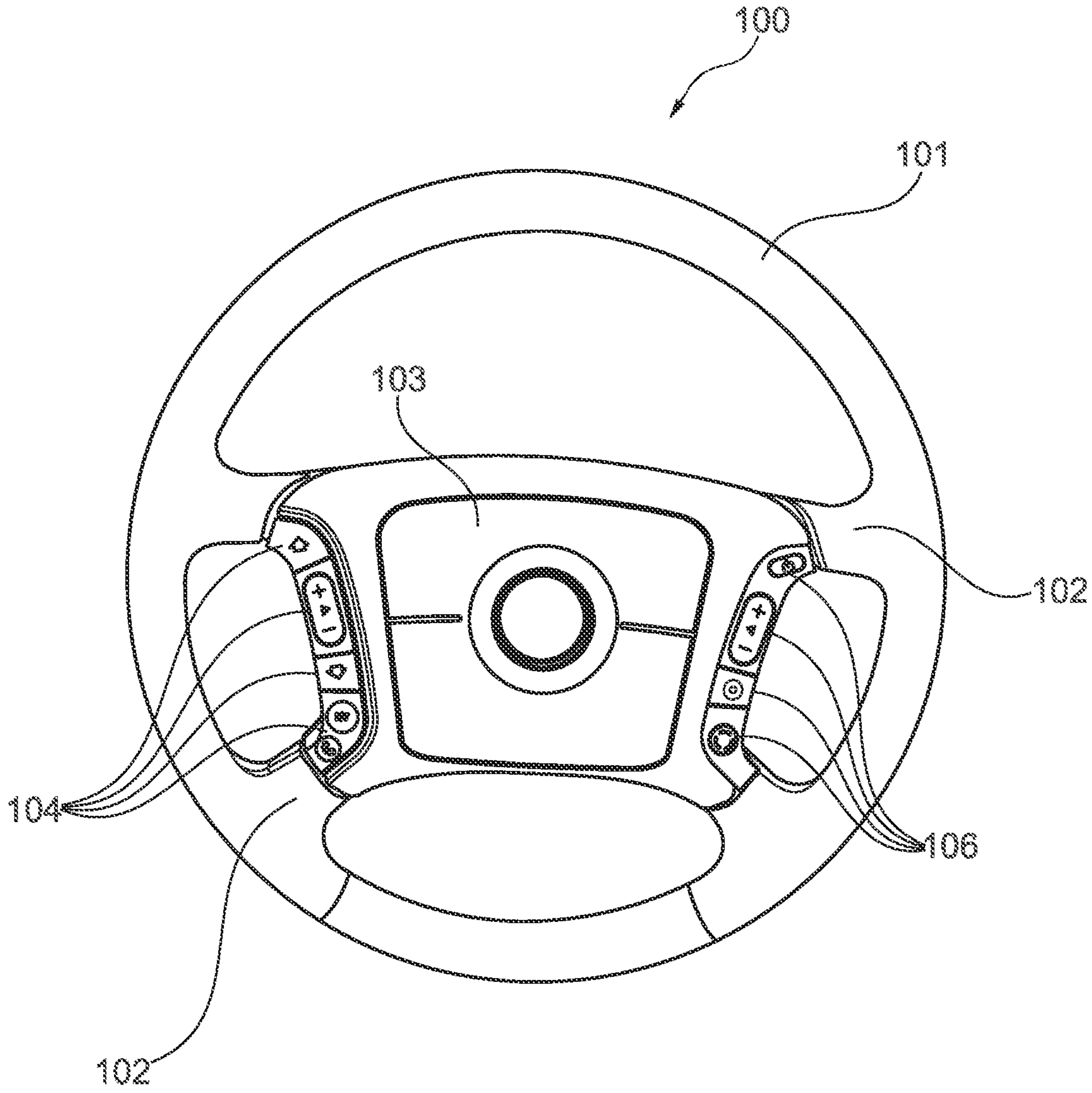
FIG. 1 a steering wheel with electric buttons.

FIG. 1 shows an automobile steering wheel 100 with a steering wheel rim 101, steering wheel spokes 102, and an impact cup 103 in the center of the steering wheel 100. The impact cup 103 accommodates a driver airbag with its associated airbag igniter (not shown). When sensors located in the automobile detect an accident, electric signals are sent to the airbag igniter to trigger it to inflate the airbag.

On the left and right side of the impact cup 103 a plurality of electric buttons 104, 106 are arranged. For instance, the electric buttons 104 on the left-hand side in FIG. 1 are used to control an audio and telephone system of the automobile. In the same embodiment the electric buttons 106 on the right-hand side are used to control a cruise control system of the automobile. The electric buttons 104, 106 and the airbag igniter turn together with the steering wheel 100. Nevertheless, they need to be reliably connected with a stationary cabling system that provides connection with the electronic system of the automobile. This rotatable electric connection is achieved with a clock spring.

Figure 2:
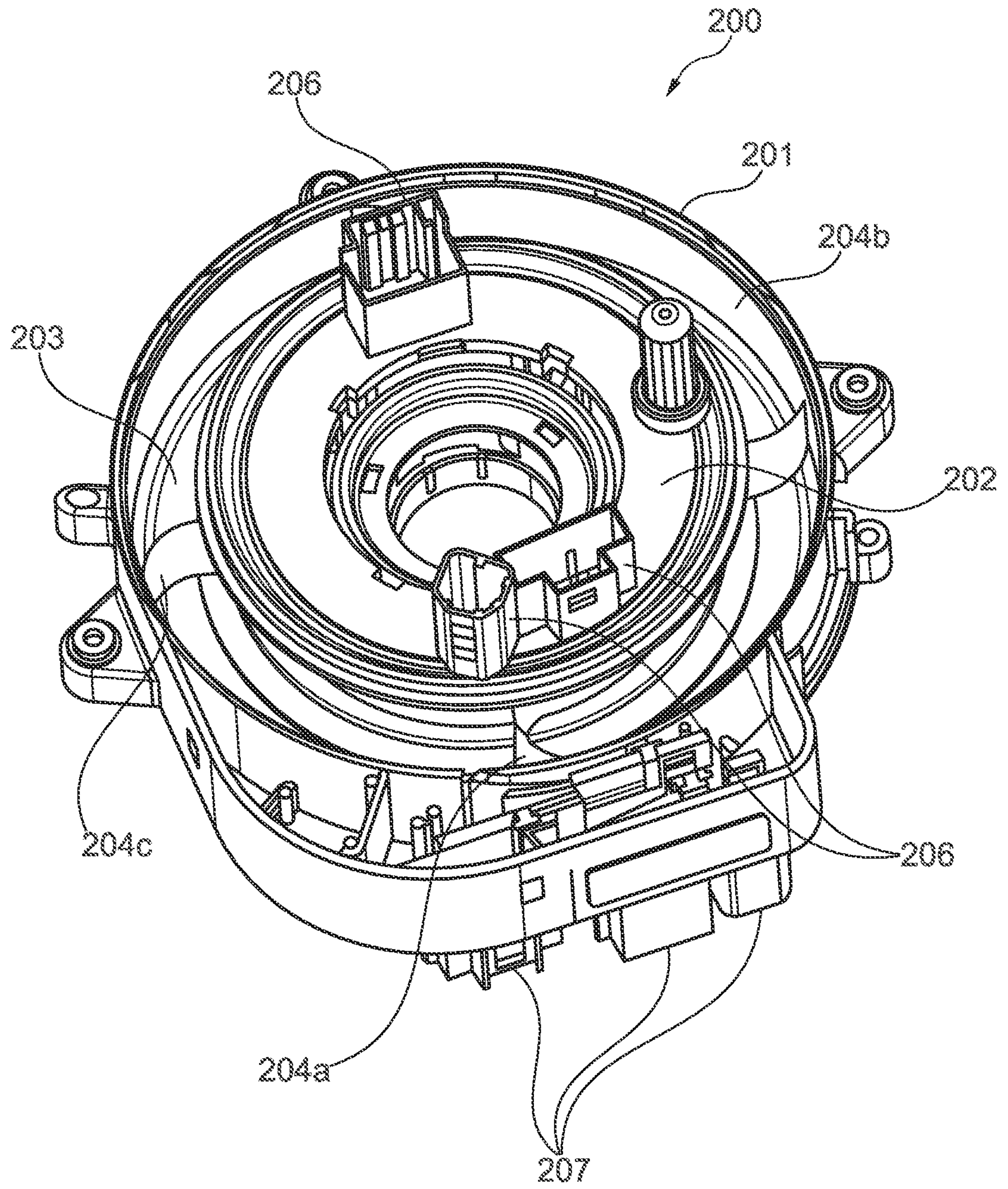
FIG. 2 a clock spring without cover in a perspective view.

FIG. 2 shows a clock spring assembly (briefly clock spring 200) in a perspective view. The clock spring 200 comprises a stationary housing 201 which, when the clock spring 200 is installed in an automobile, is fixed for example to a steering column of the automobile. Thus, the housing 201 remains stationary. When installed in the automobile, the clock spring 200 is closed by a cover which is not shown in FIG. 2 to permit a view into the interior of the clock spring 200.

In the housing 201 a rotor 202 is pivoted and can rotate relative to the housing 201. The housing 201, the rotor 202, and the cover (not shown) of the clock spring 200 define cooperatively a chamber 203 that accommodates four ribbon cables but in FIG. 2 only three ribbon cables 204*a-c* are visible. In other embodiments the clock spring 200 comprises fewer or more than four ribbon cables. The rotor 202 rotates together with the steering wheel 100. During rotation of the rotor 202, the ribbon cables 204*a-c* wind up to the rotor and unwind from the rotor, respectively, depending on the sense of rotation of the rotor. One end of each ribbon cable 204*a-c* is mechanically connected with the rotor 202 and electrically connected with sockets 206 located on the rotor 202. The other end of each ribbon cable 204*a-c* is mechanically connected with the housing 201 and electrically connected with sockets 207 located on the housing 201. The clock spring establishes a reliable and durable connection between the sockets 206 and 207 provided that the clock spring 200 is properly centered when installed. The clock spring is properly centered when its neutral position coincides with the neutral position of the steering wheel. Proper centering of the clock spring during manufacturing of the automobile is secured for instance by locking means preventing the clock spring rotor from turning out of its centered position. However, in a repair shop with less experienced staff it may the clock spring is not properly centered when it is reinstalled. The problems caused by a clock spring 200 which is not properly centered are explained in the following.

In other embodiments one or several of the sockets 206, 207 are replaced by plugs. Plugs and sockets are generally referred to as electrical connectors.

Figure 3A:
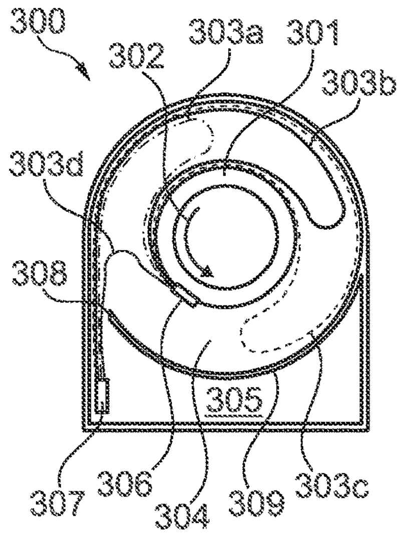
FIGS. 3A, 3B a clock spring out of its centered position towards the left-hand side.
Figure 3B:
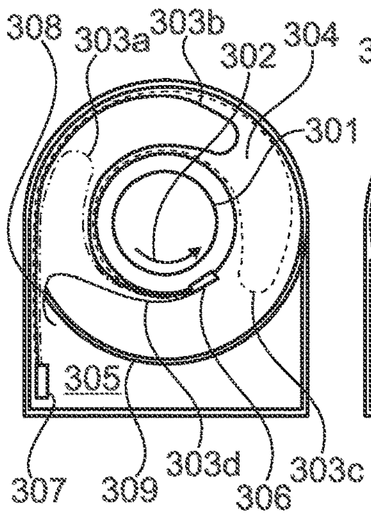

FIG. 3A schematically illustrates a clock spring 300 with a rotor 301 out of the center position by a half or full rotation to the left as indicated by arrow 302. The clock spring 300 comprises four ribbon cables 303*a-d* located in a chamber 304 that is defined between the rotor 301 and a stationary housing 305. The ribbon cables 303*a-d* are connected on the one hand with a socket 306 located on the rotor 301 and with a socket 307 located on the housing 305. As can be seen in FIG. 3A ribbon cable 303*d* is almost completely wound up on the rotor 301 in the counter-clock sense. However, since the steering wheel connected with the clock spring 300 has not yet arrived on its left stop, the ribbon cable 303*d* becomes at first tensioned over an edge 308 of an internal wall 309 of the housing 305 and is then disrupted as it is shown in FIG. 3B. If that happens, the driver of the automobile is informed by a warning signal indicating a technical defect in the driver can take care of the problem by visiting a repair shop. Even though the described situation is undesirable, the problem can be easily managed. Much more problematic is a situation described in the following.

Figure 3C:
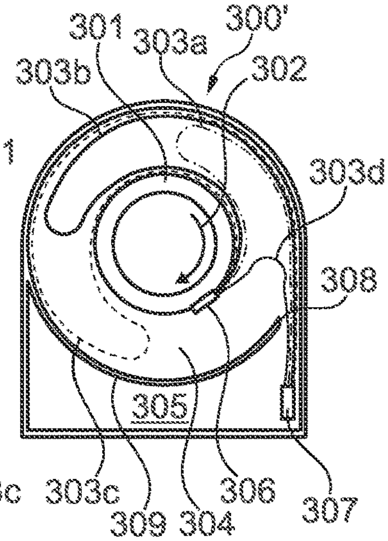
FIG. 3C a clock spring with ribbon cables, which are wound in clockwise direction on the rotor.

In other embodiments, the ribbon cables 303*a-d* are wound in clockwise direction on the rotor 301 as shown in FIG. 3C for clock spring 300'. But in principle the functionality of the clock spring 300' is the same compared with clock spring 300. Therefore, without limitation of generality, reference is made in the following only to clock springs having ribbon cables that are wound counterclockwise on the rotor. To understand the functionality of the other type of clock springs, only the sense of rotation has to be exchanged.

Figure 4A:
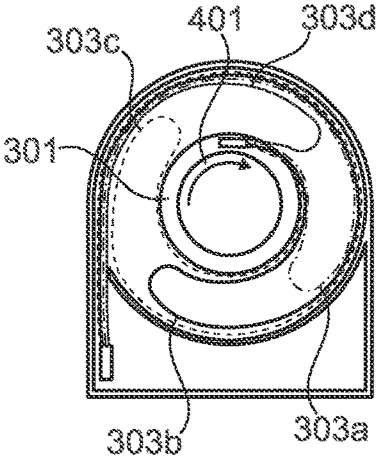
FIGS. 4A-4C a clock spring out of its centered position towards the right-hand side.
Figure 4B:
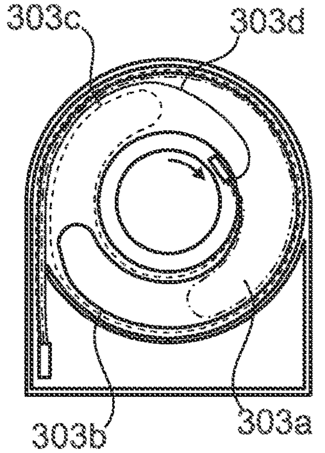
Figure 4C:
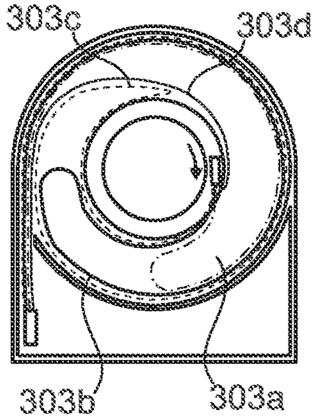

FIG. 4A shows a clock spring 300 with the rotor 301 out of the center position by the half or full rotation to the right as indicated by arrow 401. In FIG. 4B the rotor 301 has turned further to the right-hand side by approximately 45°. In FIG. 4C the rotor 301 has turned to the right-hand side by approximately 90° compared with the situation shown in FIG. 4A. In the situation shown in FIG. 4C the loops of the ribbon cables 303*c*, 303*d* have collapsed and conductor paths of the ribbon cables are overbent. The overbending may damage the conductor paths of the ribbon cables 303*c*, 303*d* and faulty electrical signals may occur due to that. The overbending of the ribbon cables 303*c*, 303*d* does not necessarily trigger a warning signal and, thus, the driver does not become aware of the problem. In the worst case, faulty electrical signals may trigger the airbag igniter at any time. This may even cause an accident.

In summary one can say that the installation of a clock spring in an uncentered position with a rotation to the left does not remain to be undetected because rather sooner than later one ribbon cable will tear off and a failure signal, for instance a warning light, will inform the driver about the defect. In contrast to that, if the coil spring is installed in an un-centered position with a rotation to the right, it may happen that one or several ribbon cables are damaged over time of operation of the coil spring, but the driver does not receive a warning signal regarding this defect. In order to improve this situation, the present disclosure proposes a modified clock spring in which the ribbon cable is also disrupted or torn off when the clock spring is installed in an uncentered position to the right-hand side.

Figure 5A:
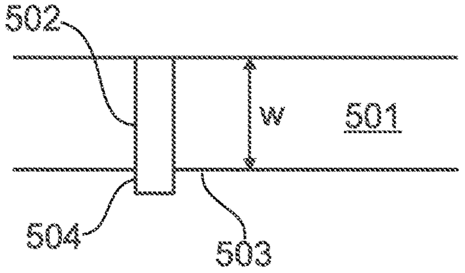
FIGS. 5A, 5B a ribbon cable with a rupture pin.
Figure 5B:
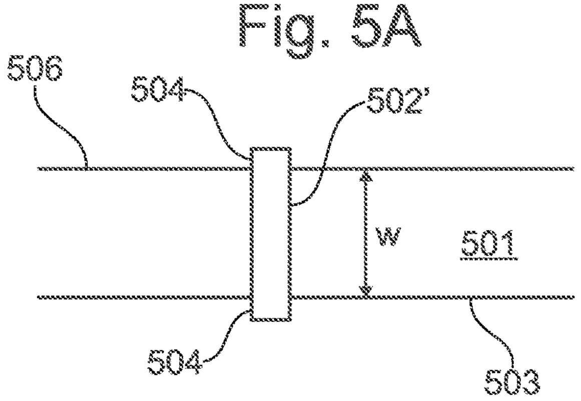

To this end, the present disclosure suggests equipping at least one ribbon cable 501 with a rupture pin 502 affixed to the ribbon cable 501 at a predefined position as it is shown in FIG. 5A. The rupture pin 502 extends on one side of the ribbon cable beyond a longitudinal edge 503 of the ribbon cable 501 and forms a protrusion 504. The width w of the ribbon cable 501 is indicated with a double headed arrow. In FIG. 5B an alternative embodiment of the rupture pin 502' is shown which extends beyond both longitudinal edges 503 and 506 of the ribbon cable 501 and forms two protrusions 504. The rupture pin 502' is realized as a spring pin that can be elastically compressed. In the following the function of the rupture pin is explained only in connection with the rupture pin 502 for the sake of simplicity. But in principle the functionality of the rupture pin 502' is the same.

The rupture pin 502 will disrupt or tear off the ribbon cable 501 if the clock spring has been installed in an un-centered position towards the right-hand side. The disruption of a single ribbon cable is sufficient to enable triggering a warning signal to the driver. Consequently, the driver can notice that a problem exists and can take care of it. Thus, the situation of a clock spring uncentered to the right-hand side becomes comparable with the situation of the clock spring uncentered to the left-hand side.

Figure 6A:
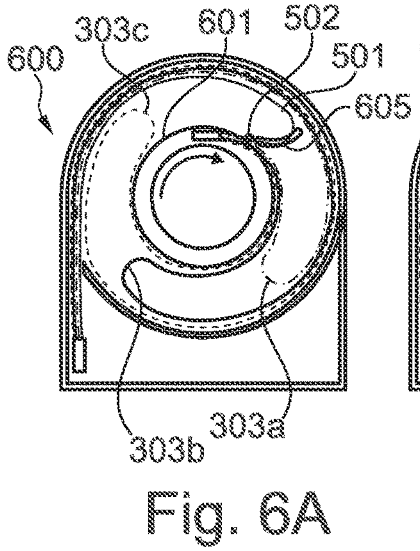
FIGS. 6A-6C a clock spring according to the present disclosure out of its centered position towards the right-hand side.

In the following an embodiment of the modified clock spring will be described. FIG. 6A shows a correctly centered clock spring 600 having a rotor 601 that has reached its end position after turning to the right-hand side. The clock spring 600 further comprises a stationary housing 602 that is provided with a curved slot 605. The clock spring 600 comprises three conventional ribbon cables 303*a-c* and additionally the ribbon cable 501 with the rupture pin 502 as a fourth ribbon cable. In the end position shown in FIG. 6A the rupture pin 502 is adjacent to the curved slot 605 but is not captured in the curved slot 605.

Figure 6B:
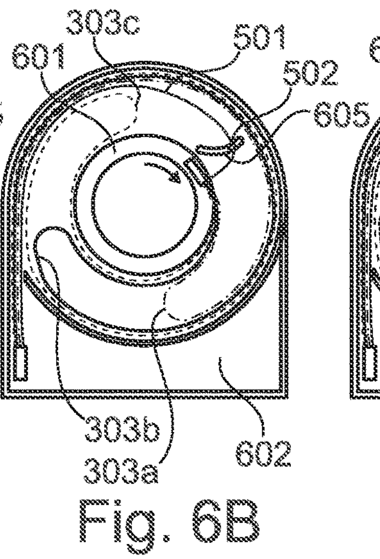
Figure 6C:
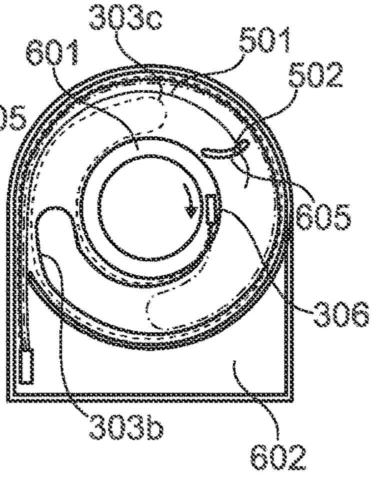

FIG. 6B displays the clock spring 600 when it is installed in an uncentered fashion towards the right-hand side. In this situation, the rupture pin 502 is captured by the curved slot 605 when the rotor 601 reaches a certain rotational position after having turned to the right-hand side. If the rotor 601 continues to be turned to the right-hand side the rupture pin 502 engages in the curved slot 605 and blocks any further movement of the ribbon cable 501. As a result, the ribbon cable 501 is torn off from the socket 306 as shown in FIG. 6C. The breaking of the electrical connection associated with the ribbon cable 501 is detected and a warning signal to the driver of the automobile is triggered.

Figure 7A:
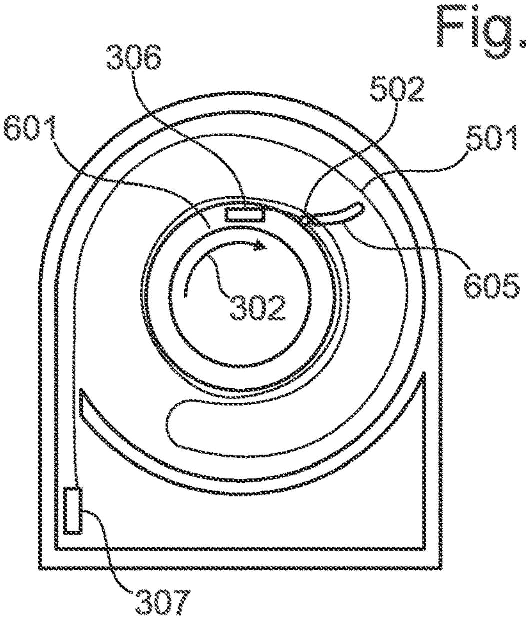
FIGS. 7A, 7B a clock spring according to the present disclosure when it is installed in its centered position.
Figure 7B:
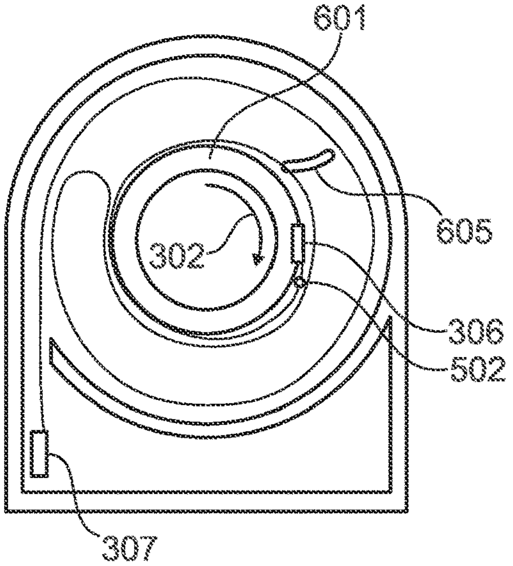

FIGS. 7A and 7B displays simplified illustration of the clock spring 600 in which only the ribbon cable 501 is shown as single ribbon cable. When the rotor 601 of the clock spring 600 is initially turned to the right-hand side, the rupture pin 502 passes of the curved slot 605 without engaging with the slot 605 because the rupture pin 502 is still covered by one the layer of the ribbon cable 501 which prevents the rupture pin from engaging with the curved slot 605. Before the rupture pin 502 passes the curved slot 605 again in the same sense of rotation, the steering wheel 100 connected with the rotor 601 arrives at its right stop and the rupture pin 502 does not engage with the curved slot 605 if the clock spring 600 has been installed properly centered. However, if the clock spring 600 has been installed in an uncentered position towards the right-hand side, then the rupture pin 502 engages with the curved slot 605 and the ribbon cable 501 is torn off from the socket 306 as shown in FIG. 6C.

Figure 7C:
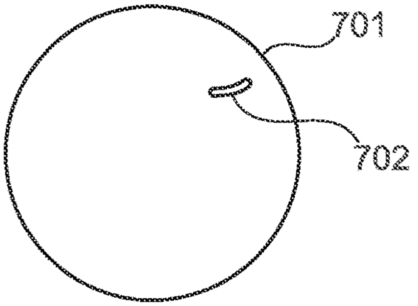
FIG. 7C a cover of the clock spring according to the present disclosure.

In an embodiment utilizing a rupture pin 502' with two protrusions 504 extending beyond both longitudinal edges 503, 506 of the ribbon cable 501 the cover 701 of the clock spring 600 is provided with a slot 702 that corresponds to the slot 605 as shown in FIG. 7C. The protrusions 504 enter simultaneously into the slots 605 and 702, respectively. The functionality of the rupture pin 502' in this embodiment is essentially the same as the rupture pin 502.

In the claims, the word "comprising" does not exclude other elements or steps, and the indefinite article "a" does not exclude a plurality.

A single unit or device may perform the functions of multiple elements recited in the claims. The fact that individual functions and elements are recited in different dependent claims does not mean that a combination of those functions and elements could not advantageously be used.

| List of reference signs | |
|---|---|
| 100 | steering wheel |
| 101 | steering wheel rim |
| 102 | steering wheel rims |
| 103 | impact cup |
| 104, 106 | Electric |
| 200 | clock spring |
| 201 | housing |
| 202 | rotor |
| 203 | chamber |
| 204a-c | Ribbon cable |
| 206 | Socket |
| 207 | Socket |
| 300 | Clock spring |
| 301 | Rotor |
| 302 | Arrow |
| 303a-d | Ribbon cables |
| 304 | Chamber |
| 305 | Housing |
| 306 | Socket on the rotor |
| 307 | Socket on the housing |
| 401 | Arrow |
| 501 | Ribbon cable |
| 502 | Rupture pin |
| 503 | Edge of ribbon cable |
| 504 | Protrusion |
| 506 | Edge of ribbon cable |
| 600 | Clock spring |
| 601 | Rotor |
| 602 | Housing |
| 605 | Slot |
| 701 | Cover |
| 702 | Slot |

The invention claimed is:

1. A clock spring assembly comprising:

a stationary housing and a rotor, wherein the stationary housing and the rotor cooperatively define a chamber that accommodates at least one flexible ribbon cable that is wound in a first rotational direction onto the rotor and fixed at one end to the rotor and at another end to the stationary housing, wherein the flexible ribbon cable establishes an electrical connection between the rotor and the stationary housing, wherein a rupture pin is attached to the at least one ribbon cable, that a slot is provided in the stationary housing, and that the slot captures the rupture pin if the rotor is overwound in a second rotational direction opposite to the first rotational direction such that the rupture pin blocks the ribbon cable from unwinding any further.

2. The clock spring assembly according to claim 1, with electrical connectors attached to the rotor and to the stationary housing, respectively, wherein the electrical connectors are connected by the at least one ribbon cable.

3. The clock spring assembly according to claim 1, wherein the ribbon cable is torn off when the rotor is turned further in the second rotational direction after the ribbon cable has been blocked by the rupture pin.

4. The clock spring assembly according to claim 3, wherein the at least one ribbon cable is torn off from the electrical connector.

5. The clock spring assembly according to one of the preceding claim 1, wherein the slot is curved.

6. The clock spring assembly according to claim 1, wherein a side wall in the chamber blocks the ribbon cable when the rotor is overturned into the first rotational direction.

7. The clock spring assembly according to claim 1, wherein the rupture pin extends beyond of one or both longitudinal edges of the at least one ribbon cable.

8. The clock spring assembly according to claim 7, wherein the rupture pin is realized as a spring pin extending beyond both longitudinal edges of the at least one ribbon cable.

9. The clock spring assembly according to claim 7, wherein the clock spring assembly comprises a cover provided with a slot which captures the rupture pin if the rotor is overwound in the second rotational direction.

10. The clock spring assembly according to claim 1, wherein the rupture pin is covered with at least one layer of the ribbon cable when the rupture pin passes the slot if the clock spring assembly is installed in its centered position.

* * * * *